US006620233B1

(12) United States Patent
Seeger et al.

(10) Patent No.: US 6,620,233 B1
(45) **Date of Patent: *Sep. 16, 2003**

(54) GONIOCHROMATIC LUSTER PIGMENTS WHICH ARE BASED ON TITANIUM DIOXIDE-COATED SILICEOUS PLATELETS HEATED IN A REDUCTIVE ATMOSPHERE

(75) Inventors: Oliver Seeger, Mannheim (DE); Raimund Schmid, Neustadt (DE); Norbert Mronga, Dossenheim (DE); Jörg Adel, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/110,761

(22) PCT Filed: Oct. 25, 2000

(86) PCT No.: PCT/EP00/10522

§ 371 (c)(1),
(2), (4) Date: Apr. 23, 2002

(87) PCT Pub. No.: WO01/34710

PCT Pub. Date: May 17, 2001

(30) Foreign Application Priority Data

Nov. 8, 1999 (DE) ........................................ 199 53 655

(51) Int. Cl.[7] ................................................ C04B 14/20
(52) U.S. Cl. ....................... 106/417; 106/415; 106/418; 106/439; 106/456
(58) Field of Search ................................ 106/430, 415, 106/417, 418, 439, 456

(56) References Cited

U.S. PATENT DOCUMENTS 5,958,125 A * 9/1999 Schmid et al. .............. 106/417
6,139,614 A * 10/2000 Schmid et al. .............. 106/417

FOREIGN PATENT DOCUMENTS

| | | |
|---|---|---|
| DE | 196 18 569 | 11/1997 |
| EP | 0 033 457 | 8/1981 |
| EP | 0 332 071 | 9/1989 |
| EP | 0 655 486 | 5/1995 |
| EP | 0 668 329 | 8/1995 |
| EP | 0 708 154 | 4/1996 |
| EP | 0 735 115 | 10/1996 |
| EP | 0 753 545 | 1/1997 |
| EP | 0 832 943 | 4/1998 |
| EP | 0 933 403 | 8/1999 |
| EP | 0 959 109 | 11/1999 |

* cited by examiner

*Primary Examiner*—C. Melissa Koslow
*Assistant Examiner*—Shalie Manlove
(74) *Attorney, Agent, or Firm*—Oblon, Spivak, McClelland, Maier & Neustadt, P.C.

(57) ABSTRACT

Goniochromatic luster pigments are based on titanium dioxide-coated silicatic platelets which have been heated in a reducing atmosphere and which comprise at least one layer packet comprising A) a colorless coating having a refractive index $n \leqq 1.8$ and B) a coating which has a refractive index $n \geqq 2.0$, which includes iron(III) oxide and which selectively absorbs visible light.

10 Claims, No Drawings

GONIOCHROMATIC LUSTER PIGMENTS WHICH ARE BASED ON TITANIUM DIOXIDE-COATED SILICEOUS PLATELETS HEATED IN A REDUCTIVE ATMOSPHERE

The present invention relates to novel goniochromatic luster pigments based on titanium dioxide-coated silicatic platelets which have been heated in a reducing atmosphere and which comprise at least one layer packet comprising A) a colorless coating having a refractive index n≦1.8 and B) a coating which has a refractive index n≧2.0, which includes iron(III) oxide and which selectively absorbs visible light.

This invention further relates to the production of these luster pigments and to their use for coloring coatings, inks, including printing inks, plastics, glasses, ceramic products and decorative cosmetic preparations.

Luster or effect pigments are used in many sectors of industry, for example in automotive coatings, decorative coating, plastics pigmentation, paints, printing inks, especially security printing inks, and cosmetics.

Their optical effect is based on the directed reflection of light at predominantly sheetlike, mutually parallel-oriented, metallic or strongly refractive pigment particles. Depending on the composition of the pigment platelets, interference, reflection and absorption phenomena create angle-dependent color and lightness effects.

Owing to their uncopiable optical effects, these pigments are increasingly gaining in importance for the production of forgeryproof security documents, such as banknotes, checks, check cards, credit cards, tax stamps, postage stamps, rail and air tickets, telephone cards, lottery tickets, gift vouchers, passes and identity cards.

Markings prepared with the effect pigments and the absence of these markings or their alteration, for example in a color copy (disappearance of color flops and luster effects), are reliably discernible by the unaided, naked eye and so make it easy to distinguish the copy from the original.

Particular interest pertains to goniochromatic luster pigments which exhibit an angle-dependent color change between two or more intensive interference colors and hence an attractive color play.

The prior art discloses a number of goniochromatic luster pigments based on metallic substrates or on nonmetallic substrates which are at least partially transparent to visible light, both the metallic and the nonmetallic substrates being coated with a combination of low refractive and high refractive or reflecting coatings.

An important group of known goniochromatic luster pigments are the goniochromatic luster pigments wherein the platelet-shaped substrate has been repeatedly coated with low refractive metal oxide (especially silicon dioxide) and high refractive metal oxide (especially iron(III) oxide or titanium dioxide).

For instance, EP-A-708 154 and 753 545 describe goniochromatic luster pigments which are based on respectively aluminum and iron oxide platelets which have first been coated with a silicon dioxide layer and then with an iron(III) oxide layer. The interference colors of these pigments are predominantly in the red hue region.

DE-A-196 18 569 discloses a luster pigment which is based on mica platelets coated successively with titanium dioxide, silicon dioxide and iron(III) oxide. This luster pigment has a brownish orange masstone color and a coppery interference color. Luster pigments having a blue interference color and high transparency are obtainable according to DE-A-196 18 569 when the outer iron oxide layer is replaced with a further titanium dioxide layer.

According to EP-A-933 403 luster pigments having a blue masstone color are obtainable by successive coating of mica platelets with titanium dioxide, silicon dioxide and cobalt aluminate.

Finally, EP-A-753 545 and prior German Patent Application 198 22 046.4 disclose goniochromatic pigments based on mica platelets which comprise an inner titanium dioxide layer reduced in the presence of ammonia. The pigment described in EP-A-753 545 is additionally coated with silicon dioxide and molybdenum and has a vigorous blue interference color which flops toward violet at comparatively steep viewing angles. However, this pigment presents problems with regard to waterfastness. In prior German Patent Application 198 22 046.4 the substrate particles are additionally coated with silicon dioxide and titanium dioxide. The luster pigments obtained are intensively blue and have high lightness values.

It is an object of the present invention to provide further goniochromatic luster pigments for the blue to green hue region which have advantageous application properties.

We have found that this object is achieved by the goniochromatic luster pigments defined at the beginning.

The present invention further provides a process for producing these luster pigments, which comprises applying said coatings (A) and (B) independently of each other to said titanium dioxide-coated silicatic platelets which have been heated in a reducing atmosphere either wet-chemically by hydrolytic decomposition of organic or inorganic metal compounds or by gas phase decomposition of volatile, organic or inorganic metal compounds.

The present invention finally provides for the use of the luster pigments of the present invention for coloring coatings, inks, including printing inks, plastics, glasses, ceramic products and decorative cosmetic preparations.

The goniochromatic luster pigments of the present invention are based on titanium dioxide-coated silicatic platelets which have been heated in a reducing atmosphere and which comprise multiple coating.

Suitable silicatic platelets include especially light-colored or white micas, particular preference being given to flakes of preferably wet-ground muscovite. It will be appreciated that the range of useful starting materials further includes other natural micas, such as phlogopite or biotite, artificial micas, talcum or glass flakes or silicon dioxide platelets.

The silicatic platelets sent for reduction are coated with a layer which consists essentially of titanium dioxide and which may include further, preferably colorless metal oxides such as tin dioxide, zirconium dioxide, aluminum oxide and silicon dioxide as minor constituents (generally <5% by weight).

The size of the silicate platelets is not critical per se and can be adapted to the particular application intended. In general, the platelets have mean largest diameters from about 1 to 200 $\mu$m, especially from about 5 to 100 $\mu$m, and thicknesses from about 0.1 to 1 $\mu$m, especially around about 0.5 $\mu$m. Their specific free surface area (BET) is customarily within the range from 1 to 15 $m^2$/g, especially within the range from 3 to 12 $m^2$/g.

The thickness of the $TiO_2$ layer determines the reflection color of the platelets and is preferably within the range from 50 to 100 nm (silver) or within the range from 300 to 340 nm (blue; optical layer thicknesses).

To produce the luster pigments of the invention, the titanium dioxide-coated silicate platelets have been heated in a reducing gas atmosphere.

Examples of suitable reducing gases include ammonia gas, hydrogen, volatile hydrocarbons (especially $C_1$–$C_4$-alkanes) and mixtures thereof. These gases are preferably used mixed with inert gases such as nitrogen (cf. EP-A-735 115 and the references cited therein, which include EP-A-332 071).

Preferred reducing gases are ammonia gas and mixtures of ammonia gas with volatile hydrocarbons such as methane, ethane and/or propane, for which a volume ratio of from about 95:5 to 70:30 is advisable. The proportion of the particularly preferred reducing gas/inert gas mixtures which is accounted for by nitrogen is preferably, respectively, up to 90% by volume and within the range from 10 to 60% by volume.

Suitable temperatures for the reduction are generally within the range from 400 to 900° C. and preferably within the range from 750 to 850° C. when ammonia gas is used and >800 to 900° C. when ammonia gas/hydrocarbon mixtures are used.

The reduction leads to the formation of blue, reduced titanium species having oxidation states <4 to 2 (lower titanium oxides such as $Ti_3O_5$, $Ti_2O_3$ to TiO, titanium oxynitrides and also titanium nitride). It is customary for from 5 to 100% by weight of the titanium dioxide originally present to be reduced.

Reduced titanium dioxide-coated mica pigments are commercially available under the name of Paliocrom®.

The reduced, titanium dioxide-coated silicatic platelets are highly refractive. Their refractive index n is generally $\geqq$2.0, preferably $\geqq$2.4. With regard to visible light, they vary from essentially transparent to virtually nontransparent as a function of the contemplated wavelength.

The luster pigments of the present invention combine a colorless low refractive coating (A) with a high refractive coating (B) which includes iron(III) oxide and absorbs visible light selectively. They may comprise a plurality of identical or different combinations (layer packets) of (A)+(B), but coating with just one layer packet (A)+(B) is preferred.

The colorless low refractive coating (A) has a refractive index n$\leqq$1.8, preferably $\leqq$1.6, and an absorption constant k=0 in the visible wavelength range.

The layer material (A) is suitably any low refractive colorless substance which can be applied to the substrate platelets in the form of a durable film, inorganic materials being preferred.

Particularly suitable materials include for example metal oxides and metal oxide hydrates such as silicon oxide, silicon oxide hydrate, aluminum oxide, aluminum oxide hydrate and mixtures thereof, preference being given to silicon oxide (hydrate).

The geometric layer thickness of the coating (A) is generally within the range from 50 to 800 nm, preferably within the range from 100 to 600 nm. Since the layer (A) essentially determines the interference colors of the pigments of the present invention, it has a minimum layer thickness of about 200 nm for luster pigments which have just one layer packet (A)+(B) and which exhibit a particularly pronounced color play and hence are also preferred. If a plurality (e.g., 2, 3 or 4) of layer packets (A)+(B) are present, the layer thickness of (A) is preferably within the range from 50 to 200 nm.

As the layer thickness of (A) increases, the dry pigment powder is observed in plan view to pass repeatedly in succession through the interference colors of blue-green-gold-red-violet, the angle dependence of the hue increasing starting with the second order blue. However, the interference colors are visible only in the dry state and disappear completely in the moist state or in varnish. The additional coating with (B) renders the optically variable layer visible in varnishes, too.

The selectively absorbing iron(III) oxide coating (B) has a refractive index n$\geqq$2.0, especially $\geqq$2.4.

The coating (B) preferably consists essentially of $\alpha$-$Fe_2O_3$ or $\gamma$-$Fe_2O_3$ or mixtures thereof, and $\alpha$-$Fe_2O_3$ layers are particularly preferred.

The coating (B) should be at least partially transparent to visible light and generally has a geometric layer thickness of about 5 to 80 nm, preferably from 10 to 50 nm, particularly preferably from 15 to 45 nm, most preferably from 20 to 40 nm.

The luster pigments of the invention are notable for the uniform, homogeneous and filmlike construction of their interference-capable coating completely enrobing the substrate particles and for their high hiding power, their pronounced goniochromaticity, their "silky soft esthetics" and their stability.

They surprisingly exhibit intensively blue to green interference colors, which could not be expected on the basis of the selective absorption of the iron(III) oxide in the blue region, and hence add to the pallet of known luster pigments in an advantageous manner.

In the process of the present invention for producing the luster pigments, the coatings (A) and (B) are applied independently of each other either wet-chemically by hydrolytic decomposition of organic or inorganic metal compounds or by gas phase decomposition (CVD, chemical vapor deposition) of suitable volatile metal compounds.

It will be appreciated that the two approaches may be arbitrarily combined to produce the individual layers. When both the coatings are applied wet-chemically there is no need for the (A)-coated substrate platelets to undergo intermediary drying; if the same reaction medium is used, intermediary isolation may likewise be dispensed with. Accordingly, intermediary isolation is customarily not necessary either when both the coating steps are carried out according to the CVD process.

The wet-chemical production route and the CVD production route are equally suitable for preparing the silicon and/or aluminum oxide (hydrate) layers (A).

The wet-chemical variant may advantageously be conducted in accordance with the process described in EP-A-668 329, which comprises hydrolyzing organic silicon and/or aluminum compounds in which the organic radicals are attached to the metals via oxygen atoms in the presence of the substrate platelets and of an organic solvent in which the metal compounds are soluble and which is miscible with water.

The preferred embodiment comprises hydrolyzing the metal alkoxides (especially tetraethoxysilane and aluminum triisopropoxide) in the presence of an alcohol (especially isopropanol) and of aqueous ammonia as catalyst.

The process described in EP-A-668 329 is preferably carried out by providing substrate platelets, isopropanol, water and ammonia as initial charge, heating this mixture to 40–80° C., especially 60–70° C., with stirring, and continuously adding a solution of the metal alkoxide in isopropanol by metering. Following a post-addition stirring time of usually from about 1 to 15 h, the mixture is cooled down to room temperature, and the coated pigment is isolated by filtration and drying.

Silicon oxide (hydrate) coatings (A) may advantageously also be produced from alkali metal silicates, especially sodium silicate.

An advantageous procedure is to suspend the substrate platelets in water, heat the suspension to about 20–100° C., preferably 40–80° C., using a base (especially an alkali metal hydroxide solution such as potassium hydroxide solution or sodium hydroxide solution) to set a pH of generally 4–9, preferably 6.5–8.5, especially about 7.5, and meter in the alkali metal silicate solution while at the same time adding an aqueous inorganic acid such as hydrochloric acid, especially dilute hydrochloric acid, to keep the pH constant. If necessary, the batch is subsequently stirred for a period ranging from a few min up to 2 h.

The CVD variant may be carried out according to the process described in EP-A-708 154. Silanes containing at least one alkanoyloxy radical are decomposed in the gas phase using water vapor and, if the silanes also contain alkyl or phenyl radicals, oxygen in the presence of the fluidized substrate platelets.

Preferred silanes have alkoxy and alkanoyloxy radicals, and particular preference is given to di-tert-butoxydiacetoxysilane.

To carry out the CVD variant it is advisable to employ (as generally customary for CVD processes) a fluidized bed reactor. The substrate platelets are fluidized in the reactor with an inert gas such as nitrogen while being heated to the desired reaction temperature (generally 100–600° C., preferably 150–300° C.), and then silane and water vapor (and also, if appropriate, oxygen) are then introduced via separate nozzles from upstream vaporizer vessels with the aid of inert carrier gas streams (advantageously bleed streams of the fluidizing gas), the silane concentration being advantageously maintained at ≦5% by volume, preferably ≦2% by volume, based on the total amount of gas in the reactor. The amount of water vapor should be not less than the amount stoichiometrically required to hydrolyze the silane, but from 10 to 100 times that amount is preferable.

Similarly, the coatings (B) may be deposited both by the CVD route and by the wet-chemical route, although the CVD variant is preferred.

Iron carbonyls, especially iron pentacarbonyl, are the preferred starting components for the CVD variant, which is advantageously carried out in a fluidized bed reactor similarly to the CVD variant for applying the silicon dioxide layer.

α-Iron(III) oxide layers are, as described in EP-A-33 457, advantageously deposited on the substrate platelets by oxidizing the iron pentacarbonyl with oxygen-containing gases, preferably air, in the presence or absence of water vapor, generally at from 150 to 300° C., preferably about 180 to 220° C. The fluidizing of the substrate particles and the feeding of iron pentacarbonyl and optionally water vapor is likewise effected using inert gas streams, especially nitrogen, and the iron pentacarbonyl concentration should usually be ≦5% by volume, preferably ≦2% by volume, based on the total amount of gas in the reactor. The amount of oxygen supplied should at least correspond to the amount stoichiometrically required for forming the iron oxide, but a small excess of oxygen is not harmful.

γ-Iron(III) oxide layers may, as described in EP-A-655 486, be produced according to two CVD variants. Either the iron pentacarbonyl is decomposed in the presence of at least the stoichiometrically required amount, preferably from 10 to 100 times the amount, of water vapor at from 180 to 250° C. to form magnetite, hydrogen and carbon monoxide, and the deposited magnetite film is subsequently oxidized with air at from 200 to 350° C. to form γ-$Fe_2O_3$, or the iron pentacarbonyl is first subjected to an oxidative decomposition to deposit as α-$Fe_2O_3$, which is then reduced with hydrogen-containing gases at from 200 to 400° C. to form iron(II)-containing products and then oxidized as above to γ-$Fe_2O_3$.

An advantageous way of depositing the preferred α-iron (III) oxide layers (B) wet-chemically is to heat an aqueous suspension of the (A)-coated substrate platelets to typically from 50 to 100° C., preferably from 70 to 80° C., using an acid (especially dilute hydrochloric acid) to set a pH of generally from 0.5 to 5, preferably from 2.5 to 4.0, especially of about 3.0, and to meter in an iron(III) chloride or sulfate solution while simultaneously adding a base to keep the pH constant.

The production process of the present invention makes it possible to produce the multiply coated luster pigments reproducibly in a simple manner in large volumes. The pigment particles obtained are completely enrobed and the individual coatings are of high quality (homogeneous, filmlike).

The luster pigments of the present invention are very useful for many purposes, such as coloring plastics, glasses, ceramic products, decorative cosmetic preparations and especially coatings and inks, including printing inks, including security printing inks. All industrially customary printing processes are suitable, for example screen printing, intaglio printing, bronze printing, flexographic printing and offset printing.

For these applications, the pigments of the present invention are also advantageously usable in admixture with transparent and hiding white, color and black pigments and also conventional luster pigments based on metal oxide-coated mica and metal pigments and known goniochromatic luster pigments.

EXAMPLES

Production and use of Luster Pigments According to the Invention

To evaluate the coloristics of the pigments obtained, in each case 0.4 g of the pigment was stirred into 3.6 g of a polyester mixing varnish having a solids content of 21% by weight and dispersed in a Red Devil® for 2 min. A draw bar (wet film thickness 200 μm) was then used to prepare single-stroke drawdowns of the pigmented varnishes on a piece of black and white cardboard. After the film had dried, the CIELAB values were measured with a Multiflash goniospectrophotometer from Optronik at an angle difference of from 20° to 115° to the specular angle against a black background. The reported color coordinates relate to the standard illuminant D65. L is the lightness, a* is the red/green content and b* is the blue/yellow content, H is the hue angle and C is chroma. This measuring set-up will capture only part of the color play, namely essentially the color of the coating in plan view.

Example 1 a) 130 g of a blue-silvery, ammonia-reduced $TiO_2$ mica pigment (Paliocrom® Blausilber L6000, BASF) were slurried up in 1.5 l of isopropanol and admixed initially with 520 g of water and 52 g of 25% strength by weight aqueous ammonia solution and, after heating to 60° C., with a mixture of 450 g of tetraethoxysilane and 450 g of isopropanol, this mixture being added over about 20 h. Following a post-addition stirring time of about 2 h and cooling down of the suspension, the product was filtered off, washed with isopropanol and dried at 80° C. under reduced pressure.

The dried $SiO_2$-coated pigment (264 g) had a reddish masstone color in air.

Step a) was repeated four times in total.

b) 1 kg of the $SiO_2$-coated and dried product of step a) was heated to 200° C. in a fluidized bed reactor while being fluidized with 1500 l/h of nitrogen. Separate nozzles were then used to additionally introduce 250 l/h of nitrogen passed through an upstream water reservoir temperature-controlled to 50° C., 250 l/h of air and also 400 l/h of nitrogen passed through an upstream iron pentacarbonyl reservoir maintained at room temperature. In this way, 230 g of iron pentacarbonyl were introduced into the reactor in the course of 10 h and decomposed therein to $\alpha$-$Fe_2O_3$ which deposited on the pigment platelets.

The pigment obtained had a silicon content of 27.9% by weight, a titanium content of 7.7% by weight and an iron content of 5.2% by weight. Applied in varnish, the pigment exhibited in plan view a blue interference color which flopped toward reddish violet with an increasingly inclined view.

Colorimetric data of pigment obtained:

| Measuring angle in ° | L | a* | b* | C | H |
|---|---|---|---|---|---|
| 20 | 65.2 | 2.2 | −25.6 | 25.7 | 274.8 |
| 25 | 55.2 | −0.1 | −22.3 | 22.3 | 269.8 |
| 35 | 39.3 | −2.3 | −15.5 | 15.7 | 261.4 |
| 45 | 28.8 | −2.2 | −10.6 | 10.9 | 258.2 |
| 55 | 22.1 | −1.4 | −7.5 | 7.6 | 259.2 |
| 65 | 16.6 | −0.3 | −4.5 | 4.5 | 266.7 |
| 75 | 15.5 | 0.0 | −4.0 | 4.0 | 270.0 |
| 115 | 12.1 | 0.7 | −1.1 | 1.3 | 301.1 |

Example 2 a) Example 1a) was repeated to coat 130 g of the mica pigment of Example 1 with silicon dioxide using a mixture of 500 g of tetraethoxysilane and 500 g of isopropanol over about 22 h.

The dried $SiO_2$-coated pigment (281 g) had a violet masstone color in air.

Step a) was repeated four times in total.

b) 1kg of the $SiO_2$-coated and dried product of step a) was coated with $\alpha$-$Fe_2O_3$ similarly to Example 1b).

The pigment obtained had a silicon content of 29.0% by weight, a titanium content of 7.4% by weight and an iron content of 6.2% by weight Applied in varnish, the pigment exhibited in plan view a green interference color which flopped toward reddish blue with an increasingly inclined view.

Colorimetric data of pigment obtained:

| Measuring angle in ° | L | a* | b* | C | H |
|---|---|---|---|---|---|
| 20 | 74.8 | −17.7 | −11.9 | 21.3 | 213.9 |
| 25 | 63.5 | −15.5 | −8.4 | 17.6 | 208.5 |
| 35 | 45.0 | −10.6 | −3.4 | 11.1 | 197.7 |
| 45 | 32.8 | −6.7 | −1.3 | 6.8 | 190.7 |
| 55 | 25.4 | −4.1 | −0.5 | 4.1 | 187.2 |
| 65 | 19.6 | −1.6 | −0.2 | 1.7 | 187.6 |
| 75 | 18.4 | −1.1 | −0.1 | 1.1 | 186.9 |
| 115 | 14.3 | 0.7 | 0.7 | 1.0 | 43.1 |

Example 3 a) Example 1a) was repeated to coat 130 g of the mica pigment of Example 1 with silicon dioxide using a mixture of 810 g of tetraethoxysilane and 810 g of isopropanol over about 36 h.

The dried $SiO_2$-coated pigment (370 g) had a reddish masstone color in air.

Step a) was repeated three times in total.

b) 1 kg of the $SiO_2$-coated and dried product of step a) was cored with $\alpha$-$Fe_2O_3$ similarly to Example 1b) using 190 g of iron pentacarbonyl.

The pigment obtained had a silicon content of 31.0% by weight, a titanium content of 5.9% by weight and an iron content of 4.5% by weight Applied in varnish, the pigment exhibited in plan view a blue interference color which flopped via violet toward reddish gold with an increasingly inclined view.

Colorimetric data of pigment obtained:

| Measuring angle in ° | L | a* | b* | C | H |
|---|---|---|---|---|---|
| 20 | 70.0 | 24.9 | −17.0 | 30.1 | 325.7 |
| 25 | 58.7 | 19.3 | −15.3 | 24.6 | 321.5 |
| 35 | 41.7 | 9.8 | −10.1 | 14.1 | 313.9 |
| 45 | 31.3 | 4.8 | −5.3 | 7.2 | 312.1 |
| 55 | 25.0 | 3.0 | −1.9 | 3.5 | 327.2 |
| 65 | 20.1 | 2.1 | 1.2 | 2.5 | 30.3 |
| 75 | 19.0 | 2.0 | 1.7 | 2.7 | 40.2 |
| 115 | 15.5 | 2.0 | 3.5 | 4.0 | 60.8 |

Example 4 a) Example 1a) was repeated to coat 130 g of the mica pigment of Example 1 with silicon dioxide using a mixture of 880 g of tetraethoxysilane and 880 g of isopropanol over about 40 h.

The dried $SiO_2$-coated pigment (387 g) had a reddish violet masstone color in air.

Step a) was repeated three times in total.

b) 1 kg of the $SiO_2$-coated and dried product of step a) was coated with $\alpha$-$Fe_2O_3$ similarly to Example 1b) using 190 g of iron pentacarbonyl.

The pigment obtained had a silicon content of 31.5% by weight, a titanium content of 5.6% by weight and an iron content of 4.6% by weight. Applied in varnish, the pigment exhibited in plan view a green interference color which flopped via blue toward reddish violet with an increasingly inclined view.

| Colorimetric data of pigment obtained: | | | | | |
|---|---|---|---|---|---|
| Measuring angle in ° | L | a* | b* | C | H |
| 20 | 69.6 | −3.6 | −14.3 | 14.8 | 255.8 |
| 25 | 59.4 | −7.4 | −10.3 | 12.7 | 234.3 |
| 35 | 43.3 | −10.1 | −3.3 | 10.6 | 198.0 |
| 45 | 32.6 | −8.1 | 0.5 | 8.1 | 176.3 |
| 55 | 25.7 | −5.2 | 2.4 | 5.8 | 155.1 |
| 65 | 20.2 | −2.1 | 3.6 | 4.1 | 120.3 |
| 75 | 19.0 | −1.4 | 3.8 | 4.0 | 110.9 |
| 115 | 15.0 | 0.1 | 4.1 | 4.1 | 88.4 |

Example 5 a) Example 1a) was repeated to coat 130 g of the mica pigment of Example 1 with silicon dioxide using a mixture of 950 g of tetraethoxysilane and 950 g of isopropanol over about 44 h.

The dried $SiO_2$-coated pigment (421 g) had a bluish violet masstone color in air.

Step a) was repeated three times in total.

b) 1 kg of the $SiO_2$-coated and dried product of step a) was coated with $\alpha$-$Fe_2O_3$ similarly to Example 1b) using 190 g of iron pentacarbonyl.

The pigment obtained had a silicon content of 32.0% by weight, a titanium content of 5.3% by weight and an iron content of 5.2% by weight. Applied in varnish, the pigment exhibited in plan view a golden green interference color which flopped via green toward bluish violet with an increasingly inclined view.

| Colorimetric data of pigment obtained: | | | | | |
|---|---|---|---|---|---|
| Measuring angle in ° | L | a* | b* | C | H |
| 20 | 77.0 | −29.8 | 10.4 | 31.5 | 160.8 |
| 25 | 65.9 | −25.8 | 12.3 | 28.5 | 154.5 |
| 35 | 47.8 | −16.2 | 12.4 | 20.4 | 142.7 |
| 45 | 35.6 | −8.9 | 10.2 | 13.6 | 131.2 |
| 55 | 27.9 | −4.4 | 8.2 | 9.3 | 118.1 |
| 65 | 21.8 | −0.9 | 6.5 | 6.6 | 97.8 |
| 75 | 20.6 | −0.2 | 6.2 | 6.2 | 91.8 |
| 115 | 16.6 | 1.3 | 5.1 | 5.3 | 75.5 |

We claim:

1. A goniochromatic luster pigment based on titanium dioxide-coated silicatic platelets which have been heated in a reducing atmosphere and which comprise at least one layer packet, said pigment comprising A) a colorless coating having a refractive index $n \leqq 1.8$ and B) a coating which has a refractive index $n \geqq 2.0$, which includes iron (III) oxide and which selectively absorbs visible light.

2. The luster pigment as claimed in claim 1, wherein said coating (B) consists essentially of $\alpha$-$Fe_2O_3$, $\gamma$-$Fe_2O_3$ or mixtures thereof.

3. The luster pigment as claimed in claim 1, wherein said coating (B) has a geometric layer thickness of 5 to 80 nm.

4. The luster pigment as claimed in claim 1, wherein said coating (A) consists essentially of silicon oxide, silicon oxide hydrate, aluminum oxide or aluminum oxide hydrate.

5. The luster pigment as claimed in claim 1, comprising just one layer packet (A)+(B).

6. The luster pigment as claimed in claim 1, wherein the titanium dioxide-coated silicatic platelets have been heated in a reducing atmosphere comprising ammonia gas, hydrogen, volatile hydrocarbons or mixtures thereof.

7. The luster pigment as claimed in claim 1, wherein the titanium dioxide-coated silicatic platelets have been heated in a reducing atmosphere comprising ammonia gas or a mixture of ammonia gas and volatile hydrocarbons.

8. A process for producing the luster pigment as claimed in claim 1, which comprises applying said coatings (A) and (B) independently of each other to said titanium dioxide-coated silicatic platelets which have been heated in a reducing atmosphere either wet-chemically by hydrolytic decomposition of organic or inorganic metal compounds or by gas phase decomposition of volatile, organic or inorganic metal compounds.

9. A method of coloring a composition, said method comprising mixing the luster pigment of claim 1 with a composition to be colored.

10. The method of claim 9, wherein the composition to be colored comprises a coating, an ink, a printing ink, a plastic, a glass, a ceramic product, or a cosmetic preparation.

* * * * *